(12) United States Patent
Akimoto et al.

(10) Patent No.: US 6,759,673 B2
(45) Date of Patent: Jul. 6, 2004

(54) RADIATION IMAGE READOUT METHOD AND APPARATUS

(75) Inventors: Taizo Akimoto, deceased, late of Kaisei-machi (JP); by Yaeko Akimoto, legal representative, Minamiashigara (JP); by Taisuke Akimoto, legal representative, Minamiashigara (JP); by Kousuke Akimoto, legal representative, Minamiashigara (JP); Masashi Hakamata, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 178 days.

(21) Appl. No.: 10/162,197

(22) Filed: Jun. 5, 2002

(65) Prior Publication Data

US 2002/0185620 A1 Dec. 12, 2002

(30) Foreign Application Priority Data

Jun. 6, 2001 (JP) .................................... 2001-170870

(51) Int. Cl.[7] .............................................. G01N 23/04
(52) U.S. Cl. .................... 250/587; 250/484.4; 250/581; 250/585
(58) Field of Search ............................ 250/484.4, 580, 250/581, 584–587

(56) References Cited

U.S. PATENT DOCUMENTS

| 4,816,679 | A | | 3/1989 | Sunagawa et al. |
| 4,865,967 | A | | 9/1989 | Shiraishi et al. |
| 4,922,103 | A | | 5/1990 | Kawajiri et al. |
| 5,055,681 | A | * | 10/1991 | Tsuchino et al. ........... 250/585 |
| 5,260,190 | A | | 11/1993 | Shiraishi et al. |
| 5,270,162 | A | | 12/1993 | Shiraishi et al. |
| 5,440,146 | A | * | 8/1995 | Steffen et al. ............... 250/580 |
| 5,446,292 | A | * | 8/1995 | Kohda ......................... 250/585 |
| 5,877,504 | A | * | 3/1999 | Yanagita et al. ......... 250/484.4 |
| 5,905,014 | A | * | 5/1999 | Van de Bergh ............. 430/139 |
| 5,999,638 | A | * | 12/1999 | Takeo et al. ................ 382/132 |
| 6,130,440 | A | * | 10/2000 | Ogura ......................... 250/586 |
| 6,479,829 | B1 | * | 11/2002 | Katagiri ................... 250/484.5 |

FOREIGN PATENT DOCUMENTS

| JP | 60-111568 | 6/1985 |
| JP | 60-236354 | 11/1985 |
| JP | 64-060782 | 3/1989 |
| JP | 64-060784 | 3/1989 |
| JP | 1 101540 | 4/1989 |
| JP | 04-003952 | 1/1992 |

* cited by examiner

*Primary Examiner*—Albert Gagliardl
*Assistant Examiner*—Davienne Monbleau
(74) *Attorney, Agent, or Firm*—Sughrue Mion, PLLC (57) ABSTRACT

A radiation image readout apparatus scans an excitation light in a main scanning direction and a sub scanning direction over a stimulable phosphor sheet, on which radiation energy has been stored, and detects the stimulated emission emitted thereupon; wherein, various types of phosphor sheets can be read out at a high resolution and high sensitivity. The excitation light energy level for obtaining an adequate sensitivity for each type of phosphor sheet is obtained. A controller controls the intensity of the excitation light emitted from the light source and the speed of the scanning mechanism, that is, the readout speed, whereby the excitation light projected onto a phosphor sheet of which the diffusion rate has been controlled by the inclusion therein of an navy blue colorant is of a greater energy level than the excitation light projected onto the white stimulable phosphor sheet not containing the navy blue colorant.

13 Claims, 5 Drawing Sheets

RADIATION IMAGE READOUT METHOD AND APPARATUS

BACKGROUND OF THE INVENTION

1. Field of the Invention

The present invention relates to a radiation image readout method and apparatus for reading out a radiation image, based on the radiation energy stored on a stimulable phosphor sheet, by projecting an excitation light onto the stimulable phosphor sheet.

2. Description of the Related Art

There are known stimulable phosphors, which upon the irradiation thereof by radiation, store a portion of the radiation energy, and emit upon the subsequent irradiation thereof with a visible light, a laser light, or other excitation light, a stimulated emission corresponding to the stored radiation energy. Radiation image readout apparatuses employing, for example, stimulable phosphor sheets comprising a stimulable phosphor layer containing stimulable phosphors formed on a substrate, to temporarily record the radiation image data of the radiation that has passed through a human body or other subject of photographing upon the irradiation thereof by a radiation, then causing stimulated emission to be generated by irradiating the stimulable phosphor sheet with an excitation light such as laser light, are in wide use as CR (Computed Radiography) apparatuses. Further, in accordance with the radiation image readout apparatus utilizing the stimulable phosphor sheet described above and with a view to reduce the readout time of the stimulated emission as well as making the apparatus more compact and of reduced cost, configurations have been proposed wherein: a line light source is used as an excitation light source for projecting an excitation light in a line beam onto the stimulable phosphor sheet, together with a line sensor formed of a plurality of photoelectric converting elements arranged in a straight line along the lengthwise direction of the line-shaped portions of a stimulable phosphor sheet that have been irradiated with the excitation light emitted from the line light source (hereinafter referred to as the main scanning direction); and a scanning means moves the line light source and line sensor relative to the stimulable phosphor sheet from one end of thereof to the other, in the direction substantially perpendicular to the lengthwise direction of the aforementioned line-shaped portions (hereinafter referred to as the sub-scanning direction). Refer to, for example, Japanese Unexamined Patent Publication Nos. 60 (1985)-111568, 60(1985)-236354, and 1(1989)-101540.

Further, there are widely known, as described in Japanese Unexamined Patent Publication Nos. 1(1989)-60784, 1(1989)-60782 and 4(1992)-3952, autoradiography detection systems employing stimulable phosphor sheets, wherein: a material that has been radioactively labeled is administered to an organism; the organism or a part of the organism is taken as a sample and overlaid on a stimulable phosphor sheet for a predetermined time interval so as to cumulatively record the radiation energy of the radioactively labeled sample onto the stimulable phosphor sheet; an excitation light beam such as a laser beam is scanned over the stimulable phosphor sheet, thereby causing each part of the stimulable phosphor sheet exposed to the excitation light beam to emit a stimulated emission; and the stimulated emission is photoelectrically detected, whereby an image signal representing the radiation image of the sample is obtained. According to the autoradiography detection systems, the excitation light is caused to scan over the entire surface of the sample by moving the optical system in both the main scanning direction and the sub-scanning direction relative to a stage on which the sample has been placed and maintained in a stationary position, or by moving the optical system in the main scanning direction, in which the excitation light is required to scan the sample at a high speed, and moving the stage in the sub-scanning direction, in which the excitation light can scan the sample at a relatively low speed.

The image signal obtained in each of the aforesaid systems is subjected to image processing such as gradation processing, frequency processing and/or the like appropriate for rendering the image to be read, and a radiation image of the sample is reproduced, based on the processed radiation image signal, on a recording medium such as a photographic film or a display such as a high-resolution CRT as a visible diagnostic image (a final image) for diagnosis. The visible diagnostic image is then diagnostically read by a physician, or subjected to a quantitative analysis by a computer to perform the diagnosis.

Further, there have been developed microarray detection systems, wherein: known binding materials, e.g., hormones, tumor markers, enzymes, antibodies, antigens, abzymes, other proteins, nucleic acids, cDNAs, DNAs, mRNAs and the like, each of which is capable of binding to a specific organism-derived material, according to known properties such as the sequence, lengths, the composition and/or the like of bases, are applied in droplets, by use of a spotting apparatus, onto a substrate such as a membrane filter to form a microarray of independent spots; an organism-derived material, e.g., hormone, tumor marker, enzyme, antibody, antigen, abzyme, other protein, nucleic acid, cDNA, DNA, mRNA or the like, which has been obtained as a sample from an organism by simple separation, an extraction process or the like and chemically processed or modified as desired, and radioactively labeled, is hybridized with the known binding materials on the microarray, the binding materials to which the sample material binds are radioactively labeled; the microarray is brought into close contact with a stimulable phosphor sheet to expose the stimulable phosphor sheet in the pattern of distribution of the radioactive labeling on the microarray; an excitation light beam such as a laser beam is scanned over the stimulable phosphor sheet, thereby causing the stimulable phosphor sheet exposed to the excitation light beam to emit a stimulated emission; and the stimulated emission is photoelectrically detected, whereby an analysis of the organism-derived material sampled from the organic body is obtained. According to the microarray detection system, as in the autoradiography detection system, the excitation light scanning system can be of a configuration wherein: the excitation light beam is scanned over the entire surface of the sample by moving the optical system in both the main scanning direction and the sub-scanning direction with respect to a stage on which the substrate has placed held stationary, or by moving the optical system in the main scanning direction, in which the excitation light is required to scan the sample at a high speed, and moving the stage in the sub-scanning direction, in which the excitation light can scan the sample at a relatively low speed. In the case of the microarray detection system, since the sample is small in size, the excitation light beam may be caused to scan the surface of the support by moving the stage in the main scanning direction or in both the main scanning direction and the sub-scanning direction.

According to the above-described systems wherein a stimulable phosphor sheet, on which radiation energy has been cumulatively stored, is scanned in the main scanning direction and in the sub-scanning direction by an excitation light beam, and the stimulated emission emitted from the stimulable phosphor sheet upon the irradiation thereof by the excitation light beam is detected, because there are cases in which it is necessary to read out at a high resolution the radiation image stored on the stimulable phosphor sheet, in order to prevent the scattering of the excitation light within the interior portion of the stimulable phosphor sheet in such cases, a colorant, such as an navy blue colorant that selectively absorbs the excitation light can be added to the stimulable phosphor sheet in advance, whereby the diffusion rate of the excitation light can be controlled, and the readout can be performed at a high resolution.

However, if a stimulable phosphor sheet contains a colorant such as a navy blue colorant, because excitation light and the light of the stimulated emission is absorbed by the colorant, the sensitivity thereof is deteriorated.

SUMMARY OF THE INVENTION

The present invention has been developed in view of the forgoing problems, and it is an objective of the present invention to provide a radiation image readout method and apparatus for scanning an excitation light in a main scanning direction and a sub scanning direction over a stimulable phosphor sheet, on which radiation energy has been cumulatively stored, and detecting the stimulated emission emitted from the stimulable phosphor sheet upon the irradiation thereof by the excitation light; wherein the radiation image stored on the stimulable phosphor sheet can be read out at a high resolution and high sensitivity.

The radiation image readout method according to the present invention comprises the steps of: scanning an excitation light in a main scanning direction and a sub scanning direction over the surface of a stimulable phosphor sheet, on which radiation energy has been cumulatively stored, so as to two-dimensionally irradiate the stimulable phosphor sheet with the excitation light; receiving and photoelectrically converting the stimulated emission emitted from the stimulable phosphor sheet upon the irradiation thereof by the excitation light to obtain an output signal, thereby performing readout; wherein, when the readout of a plurality of stimulable phosphor sheets having different diffusion rates with respect to the excitation light is to be performed by a single apparatus, the readout is performed by emitting an excitation light of an energy level which is greater as the excitation light diffusion rate of the stimulable phosphor sheet is smaller.

Here, because the intensity of the stimulated emission emitted from the stimulable phosphor sheet is proportional to the intensity of the excitation light with which the stimulated phosphor sheet has been irradiated, although it is thought that the energy of the excitation light should be made large in order to perform a high sensitivity detection, in actuality, even if the energy level of the excitation light were made large, if the magnitude of the energy level should exceed a predetermined size, the sensitivity is not improved; in fact it deteriorates. It has been clearly determined by an experiment conducted by the inventors of the present invention that this is due to the fact that overlap is caused to occur with the adjacent scanning lines (the next line to be scanned or the previously scanned line) owing to the scattering of the excitation light within the stimulable phosphor layer, whereby the stimulable phosphors of the adjacent scanning lines are also stimulated due to the scattered excitation light; when an actual readout is to be performed, a so-called empty reading (the excitation light is scanned over positions of which the stored radiation energy has already been dissipated by the energy of the scattered excitation light) is produced.

Figure 2:
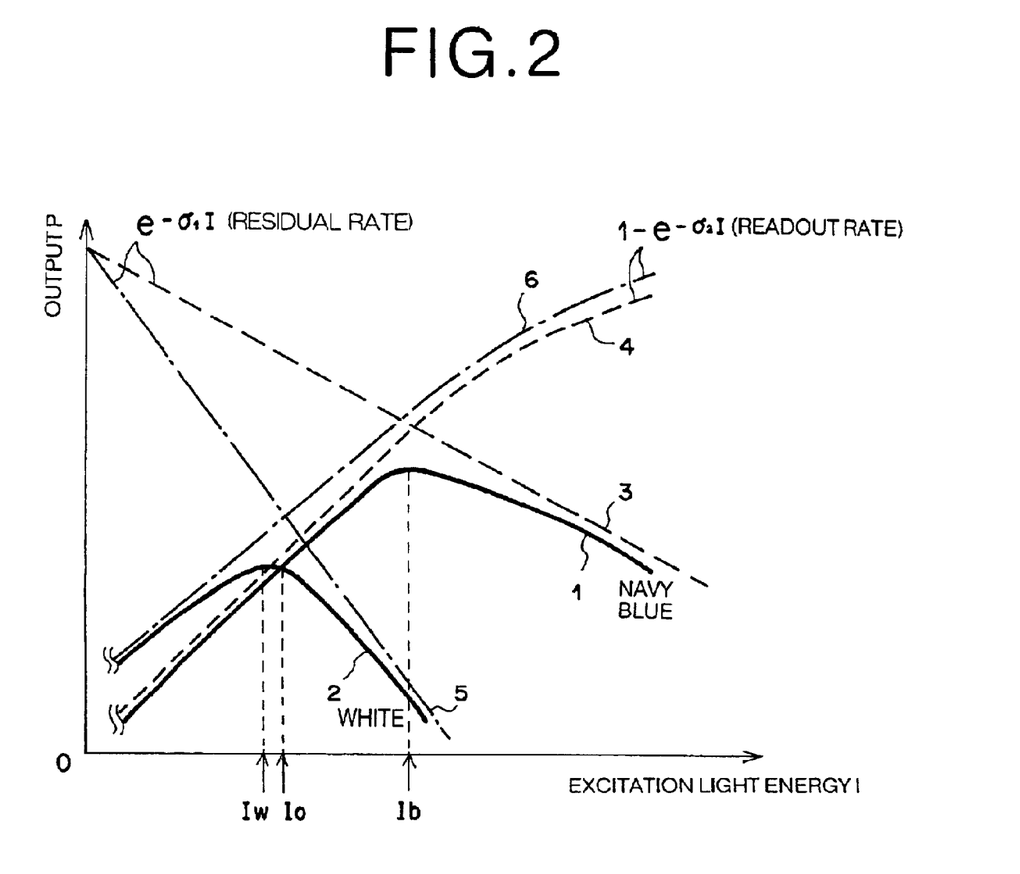
FIG. 2 is a graph illustrating the relation of the excitation light energy I and the output P occurring when readout of a stimulable phosphor sheet containing a predetermined colorant and a white stimulable phosphor sheet is performed.

Further, because dissipation of the stored radiation energy caused by the scattered excitation light exerts a significant influence in the sensitivity reduction of the stimulable phosphor sheet, by comparing the excitation light energy level $I_b$, which is the energy level at which deterioration of the sensitivity of the stimulable phosphor sheet begins in a stimulable phosphor sheet containing an navy blue colorant by which the diffusion of the excitation light is controlled, and the excitation light energy level $I_w$, which is the energy level at which deterioration of the sensitivity of the stimulable phosphor sheet begins in a white stimulable phosphor sheet not containing an navy blue colorant, as shown in FIG. 2 (the relation between the stimulated emission output and the excitation light energy level for a stimulable phosphor sheet containing the navy blue colorant is shown by the solid line 1, and the relation between the stimulated emission output and the excitation light energy level for a white stimulable phosphor sheet not containing the navy blue colorant is shown by the solid line 2), it has been clearly shown by the experiment of the inventors of the present invention that the excitation light energy level $I_b$ at which the deterioration of the sensitivity of the stimulable phosphor sheet containing the navy blue colorant begins to be caused is larger than the excitation light energy level $I_w$.

Therefore, according to the radiation image readout method of the present invention, when a single apparatus is to be used to read out stimulable phosphor sheets containing the navy blue colorant and white stimulable phosphor sheets not containing the navy blue colorant, that is to say, when stimulable phosphor sheets having different excitation light diffusion rates are to be read out, the excitation light is to be emitting an excitation light of an energy level which is greater as the excitation light diffusion rate of the stimulable phosphor sheet to be read out is smaller. Further, it is desirable that the excitation light energy level be controlled so as to be of the level indicated by $I_b$, $I_w$ shown in FIG. 2.

Further, the referents of "scanning an excitation light in a main scanning direction and a sub scanning direction over the surface of a stimulable phosphor sheet, on which radiation energy has been cumulatively stored, so as to two-dimensionally irradiate the stimulable phosphor sheet with the excitation light" can include, more specifically, any method of two-dimensionally irradiating the stimulable phosphor sheet with the excitation light: For example, a spot beam excitation light can be two-dimensionally, that is, in the main scanning direction and the sub-scanning direction, scanned over a stimulable phosphor sheet that is maintained in a fixed position; the stimulable phosphor sheet can be moved in either the main scanning direction or the sub-scanning direction, and the excitation light can be scanned over the sheet in the other direction to two-dimensionally irradiate the sheet with the excitation light; or the stimulable phosphor sheet can be moved relative to the excitation light in both the main scanning direction and the sub-scanning direction. Further, a line light source or the like can be used to scan the sheet in the main scanning direction with a line beam excitation light, and the line light source or the sheet can be moved in the sub-scanning direction to two-dimensionally irradiate the sheet with the excitation light.

Still further, the referent of "excitation light energy" is the quantity of energy of the excitation light per unit of surface area of the phosphor sheet onto which the excitation light is projected. The magnitude of the the excitation light energy can be controlled by, for example, by controlling the intensity of the excitation light, or the scanning speed of the excitation light in at least one of the main scanning direction and the sub-scanning direction.

The radiation image readout apparatus according to the present invention comprises: an illuminating means for two-dimensionally scanning, by scanning in a main scanning direction and a sub-scanning direction, a line beam excitation light over the surface of a stimulable phosphor sheet on which a radiation image has been recorded; and a photoelectrical converting means for receiving and photoelectrically converting the stimulated emission emitted from the portions of the stimulable phosphor sheet which have been irradiated by the excitation light; further comprising a recognizing means for discerning the data relating to the excitation light diffusion rates of a plurality of types of stimulable phosphor sheets; and an excitation light energy controlling means for controlling, based on the data related to the stimulable phosphor sheet excitation light diffusion rate recognized by the recognizing means, the energy level of the excitation light so that the excitation light is emitting an excitation light of an energy level which is greater as the excitation light diffusion rate of the stimulable phosphor sheet to be read out is smaller.

Here, the "photoelectrical converting means" can be any means that converts the light of the stimulated emission to electric signals, e.g., a photomultiplier, a CCD sensor, or a line sensor having a plurality of photoelectrical converting elements arranged in a straight line.

Further, the referents of "data relating to the excitation light diffusion rate" can include any data that represents the diffusion rate, e.g., data recorded on a bar code attached to the stimulable phosphor sheet, or data inputted from a predetermined input means; said data can be the diffusion rate itself of the phosphor sheet to be read out, or data related to the type of the stimulable phosphor sheet.

Still further, when the plurality of stimulable phosphor sheets consists of stimulable phosphor sheets containing a predetermined colorant for suppressing the diffusion rate and white stimulable phosphor sheets not containing the predetermined colorant, the excitation light energy control means controls the excitation light energy so that the excitation light projected onto the stimulable phosphor sheet containing the predetermined colorant is of a greater energy level than that of the excitation light projected onto the white stimulable phosphor sheet.

Here, the referents of "predetermined colorant" include colorants that selectively absorb excitation light; it is desirable that the colorant be of a reflection rate wherein the average reflection rate of the light in the excitation light wavelength range is sufficiently smaller than the average reflection rate of the wavelength range of the stimulated emission emitted by the stimulable phosphors(s) employed in the stimulable phosphor sheet. The colorant can be a pigment such as a navy blue, cobalt blue, cerulean blue, oxidized chromium, TiO2—ZnO—CoO—NiO, and the like.

Further, the excitation light energy projected onto a stimulable phosphor sheet containing a predetermined colorant can be 1.5 or more times the excitation light energy projected onto the white stimulable phosphor sheet.

Still further, the excitation light energy projected onto a stimulable phosphor sheet containing a predetermined colorant can be 3.0 or more times the excitation light energy projected onto the white stimulable phosphor sheet.

In addition, the excitation energy control means can be a means for further controlling the excitation light energy according to the pitch of the sub-scanning direction of the portions of the stimulable phosphor sheet irradiated with the line beam excitation light in the main scanning direction.

Figure 3:
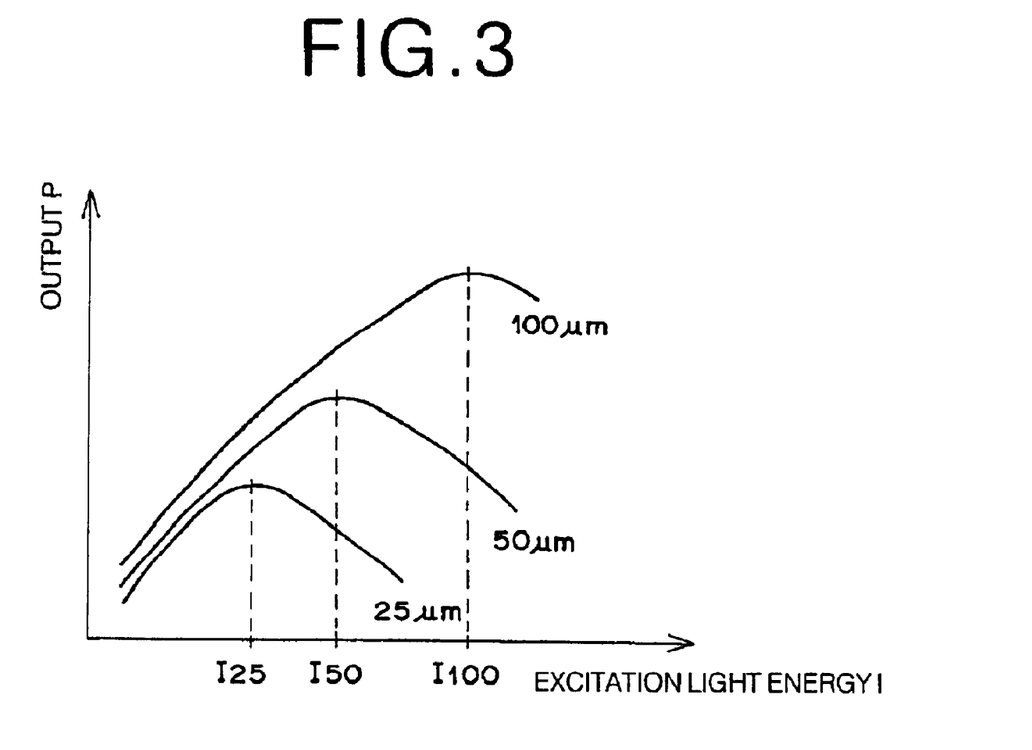
FIG. 3 is a graph illustrating the relation of the excitation light energy I and the output P occurring when a stimulable phosphor sheet containing a predetermined colorant and a white stimulable phosphor sheet are read out at a different readout pitch.

Here, the expression "controlling the excitation light energy according to the pitch of the sub-scanning direction" refers to, for example, controlling the excitation light energy so that the relation between the excitation light and the output signal for the pitch of the sub-scanning direction energy, due to the effect whereby the radiation energy on adjacent scanning lines is dissipated by the scattered excitation light, is that shown in FIG. 3 (for cases in which the sub-scanning direction pitch is 25 $\mu$m, 50 $\mu$m, and 100 $\mu$m, respectively); wherein, on the one hand, the magnitude of the output signal increases as the magnitude of the excitation light energy increases up to a predetermined magnitude of excitation light energy, and on the other hand, the magnitude of the output signal decreases due to the effect of the dissipation of the radiation energy stored on adjacent scanning lines if the excitation light energy exceeds the predetermined value, for any of the above-described pitches. And, the magnitude of excitation light energy at which the deterioration of the magnitude of the output signal is initiated becomes smaller in proportion to the smallness of the pitch. Accordingly, the excitation light energy is controlled so that an adequate signal level is obtained at each pitch; for example, $I_{25}$, $I_{50}$, $I_{100}$, wherein the excitation energy is controlled to the level whereat the largest output signal for each respective pitch is obtained.

Further, the pitch in the sub-scanning direction of the portions to be scanned with a line beam excitation in the main scanning direction can be less than or equal to 50 $\mu$m, or even less than or equal to 25 $\mu$m.

According to the radiation image readout method and apparatus of the present invention, when the readout of a plurality of stimulable phosphor sheets having different excitation light diffusion rates is to be performed by a single apparatus, because the readout is performed by emitting an excitation light of an energy level which is greater as the excitation light diffusion rate of the stimulable phosphor sheet is smaller, even for a stimulable phosphor sheet having a small excitation light diffusion rate with respect to the excitation light energy required for a high resolution readout thereof, the readout can be performed at a high sensitivity.

Further, when the plurality of stimulable phosphor sheets consists of stimulable phosphor sheets containing a predetermined colorant for suppressing the diffusion rate of the excitation light and white stimulable phosphor sheets not containing the predetermined colorant, for cases in which the excitation light energy is controlled so that the excitation light projected onto the stimulable phosphor sheets containing the predetermined colorant is of a greater energy level than that of the excitation light projected onto the white stimulable phosphor sheets, the same effect as described above, wherein a stimulable phosphor sheet requiring a high-resolution readout can be read out at a high sensitivity, can be obtained for stimulable phosphor sheets containing a predetermined colorant and white stimulable phosphor sheets not containing the predetermined colorant, respectively. At this time, for cases in which navy blue is used as the predetermined colorant, if the readout is performed at the respective excitation light energy levels $I_b$, $I_w$ as shown in FIG. 2, the readout can be performed at an even higher sensitivity.

Still further, for cases in which the excitation energy control means is a means for further controlling the excitation light energy in accordance to the pitch of the sub-scanning direction of the portions of the stimulable phosphor sheet irradiated with the line beam excitation light in the main scanning direction, the deterioration of the sensitivity of the stimulable phosphor sheet due to the dissipation of the radiation energy stored on adjacent scanning lines caused by the scattering of the excitation light within the stimulable phosphor layer can be reduced, and the readout can be performed at a high sensitivity and a high resolution.

In addition, for cases in which a high-resolution readout has been performed wherein the pitch in the sub-scanning direction is less than or equal to 50 μm, or even less than or equal to 25 μm, because the excitation light energy level is controlled in accordance to the pitch, the effect whereby the sensitivity of the stimulable phosphor sheet is deteriorated due to the dissipation of the radiation energy stored on adjacent scanning lines caused by the scattering of the excitation light within the stimulable phosphor layer can be reduced, and the readout can be performed at an even higher sensitivity.

DESCRIPTION OF THE PREFERRED EMBODIMENTS

Figure 1:
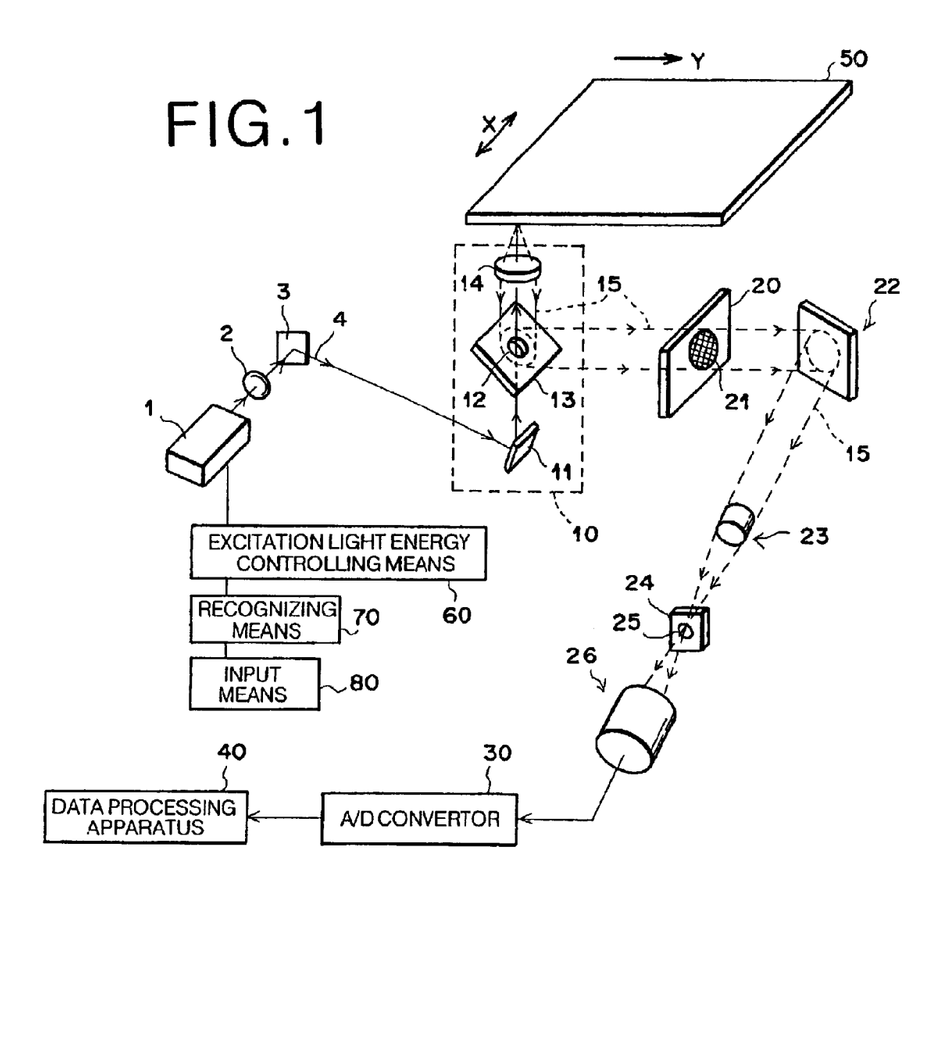
FIG. 1 is a schematic drawing of the configuration of an embodiment of a radiation image readout apparatus according to the present invention.

Hereinafter a preferred embodiment of the present invention will be explained with reference to the attached drawings. FIG. 1 is a schematic drawing of a perspective view of the configuration of an embodiment of a radiation image readout apparatus according to the present invention.

The radiation image readout apparatus according to the present invention comprises: an excitation light source 1 for emitting a laser light 4 having a wavelength of 640 nm; a collimator lens 2 for focusing and converting the laser light 4 emitted from the excitation light source 1 to a parallel light; a mirror 3 for reflecting toward a mirror 11, which is described below, the laser light 4 converted to a parallel light by the collimator lens 2; a mirror 11 for reflecting toward a perforated mirror 13, which is described below, the laser light 4 reflected by the mirror 3; a perforated mirror 13 for transmitting through a hole 12, which is formed on the interior portion thereof, the laser light 4 reflected by the mirror 11, and reflecting toward an excitation light cutoff filter 21, which is described below, the stimulated emission 15 emitted from the stimulable phosphor sheet 50, on which a radiation image has been recorded, upon the irradiation thereof by the laser light 4; a lens 14 for focusing the laser light 4 that has passed through the hole 12 of the perforated mirror 13 and projecting said laser light 4 onto the stimulable phosphor sheet 50, and converting to a parallel light the stimulated emission emitted from the stimulable phosphor sheet 50 upon the irradiation thereof by the laser light 4; a filter unit 20 having an excitation light cutoff filter 21 for cutting off the excitation light contained in the stimulated emission reflected by the perforated mirror 13; a mirror 22 for reflecting toward a focusing lens 23, which is described below, the stimulated emission that has passed through the excitation light cutoff filter 21; a focusing lens 23 for focusing the stimulated emission reflected by the mirror 22; an aperture 24 for focusing, by use of a lens 25 in its interior disposed along the optical path of the stimulated emission, onto the light receiving face of a photomultiplier 26 said stimulated emission focused by the focusing lens 23; and a photomultiplier 26 for receiving and photoelectrically converting the stimulated emission focused by the aperture 24.

The analog signal obtained by the photoelectrical conversion process of the photomultiplier 26 is subsequently digitized by an A/D converter 30, and then outputted to a data processing apparatus 40.

Further, the phosphorus sheet 50 is supported in a predetermined scanning mechanism (not shown) of a configuration movable in the X direction (the main scanning direction) and the Y direction (the sub-scanning direction) shown in FIG. 1.

Here, the radiation image readout means according to the present invention is provided with an excitation light energy controlling means 60 for controlling the excitation light energy projected onto the phosphor sheet 50 by controlling the intensity of the laser light 4 emitted from the excitation light source 1 and the scanning speed of the scanning mechanism in the X and Y directions, that is, by controlling the readout speed. The excitation light energy controlling means 60 is a means for controlling, based on a phosphor sheet type data relating to the type of the phosphor sheet 50 to be read out, of which different types have different excitation light diffusion rates, outputted from a recognizing means 70, the excitation light energy; the recognizing means 70 discerns, based on an input signal inputted from an input means 80, the type of phosphor sheet 50 and outputs the discerned phosphor sheet type to the excitation light energy controlling means 60. The excitation light energy controlling means 60 is provided with a Look Up Table (LUT) (not shown) in which the intensity of the laser light 4 to be outputted from the excitation light source 1 as well as the readout speed corresponding to a plurality of types of phosphor sheets having different excitation light diffusion rates have been recorded. The excitation light energy controlling means 60 refers to the LUT and controls the excitation light source 1 and the scanning mechanism, whereby the excitation light energy projected onto the phosphor sheet 50 is controlled. According to the current embodiment, the excitation light energy controlling means 60 is a means for controlling the excitation light energy emitted onto each of a phosphor sheet containing a navy blue colorant and a white phosphor sheet not containing an navy blue colorant.

Then, the excitation light energy corresponding to the phosphor sheet type is obtained as follows. First, if the size of the output signal based on the stimulated emission emitted from a stimulable phosphor sheet, on which a predetermined radiation image has been recorded, upon the irradiation thereof by the laser light is designated as P, and the excitation light energy as I, the relation therebetween is that shown in FIG. 2. The relation between the excitation light energy I and the output signal P for a stimulable phosphor sheet of which the diffusion rate thereof has been suppressed by the inclusion therein of the navy blue colorant is shown by the solid line 1. The relation between the excitation light energy I and the output signal P for a white stimulable phosphor sheet is shown by the solid line 2. As shown in FIG. 2, when either of the phosphor sheets is read out, the size of the output signal thereof increases as the magnitude of the excitation light energy I increases up to a predetermined value. If the magnitude of the excitation light energy exceeds the predetermined value, the size of the output signal decreases as the magnitude of the excitation light energy increases. This is due to the fact that overlap is caused to occur with the adjacent scanning lines (the next line to be scanned or the previously scanned line) owing to the scattering of the excitation light within the stimulable phosphor layer of the stimulable phosphor sheet 50, whereby the stimulable phosphors of the peripheral scanning lines are stimulated, due to the scattered excitation light, before the readout thereof is performed and the radiation energy thereof is dissipated thereby.

Accordingly, because the effect whereby the radiation energy stored on the phosphor sheet is dissipated due to the scattering of excitation light within the stimulable phosphor layer is smaller in the phosphor sheet containing the navy blue colorant, due to the fact that the excitation light diffusion rate thereof is suppressed by the inclusion therein of said navy blue colorant so as to be lower than that of the white phosphor sheet, the excitation light energy level at which the decrease of the output signal begins becomes larger. Further, due to the fact that there is absorption of the excitation light and the stimulated emission at an energy level less than or equal to that of the excitation light energy level $I_0$ by the navy blue colorant, the sensitivity of the phosphor sheet containing the navy blue colorant is lower than that of the white phosphor sheet; however, because the dissipation effect of the scattered excitation light occurring in the white phosphor sheet when the energy level of the excitation light is greater than or equal to the excitation light energy level $I_0$ becomes large, the sensitivity of the phosphor sheet containing an navy blue colorant becomes higher.

The relation between the excitation energy level 10 and the output signal P can be expressed theoretically as shown in the Formula (2).

$$P = N_0 e^{-\sigma 1 \cdot I} (1 - e^{-\sigma 2 \cdot I}) \cdot \alpha \quad (1)$$

The $N_0$ of Formula (1) is the quantity of radiation energy accumulated on the stimulable phosphor sheet 50; $e^{-\sigma 1 \cdot I}$ represents the residual rate of the radiation energy stored on the adjacent scanning lines when the stimulable phosphor sheet 50 is irradiated with by laser light. Further, $1 - e^{-\sigma 2 \cdot I}$ represents the readout rate, based on the ratio between the output signal obtained when the stimulable phosphor sheet 50 is irradiated with by laser light and the excitation energy level of said laser light, and $\alpha$ represents an absorption coefficient based on the absorption of the stimulated emission by the colorant contained in the phosphor sheet. Accordingly, when the excitation light energy level I is 0 the residual rate $e^{-\sigma 1 \cdot I}$ becomes 1, and the readout rate $1 - e^{-\sigma 2 \cdot I}$ becomes 0. Note that of course the $\sigma 1$ and the $\sigma 2$ are different for different types of phosphor sheets. In FIG. 2: the residual rate $e^{-\sigma 1 \cdot}$ of Formula (1) for the phosphor sheet containing an navy blue colorant is shown by the broken line 3, and the readout rate $1 - e^{-\sigma 2 \cdot I}$ thereof by the broken line 4; and the residual rate $e^{-\sigma 1 \cdot}$ of Formula (1) for the white phosphor sheet is shown by the dotted line 5, and the readout rate $1 - e^{-\sigma 2 \cdot I}$ thereof by the dotted line 6.

Figure 4:
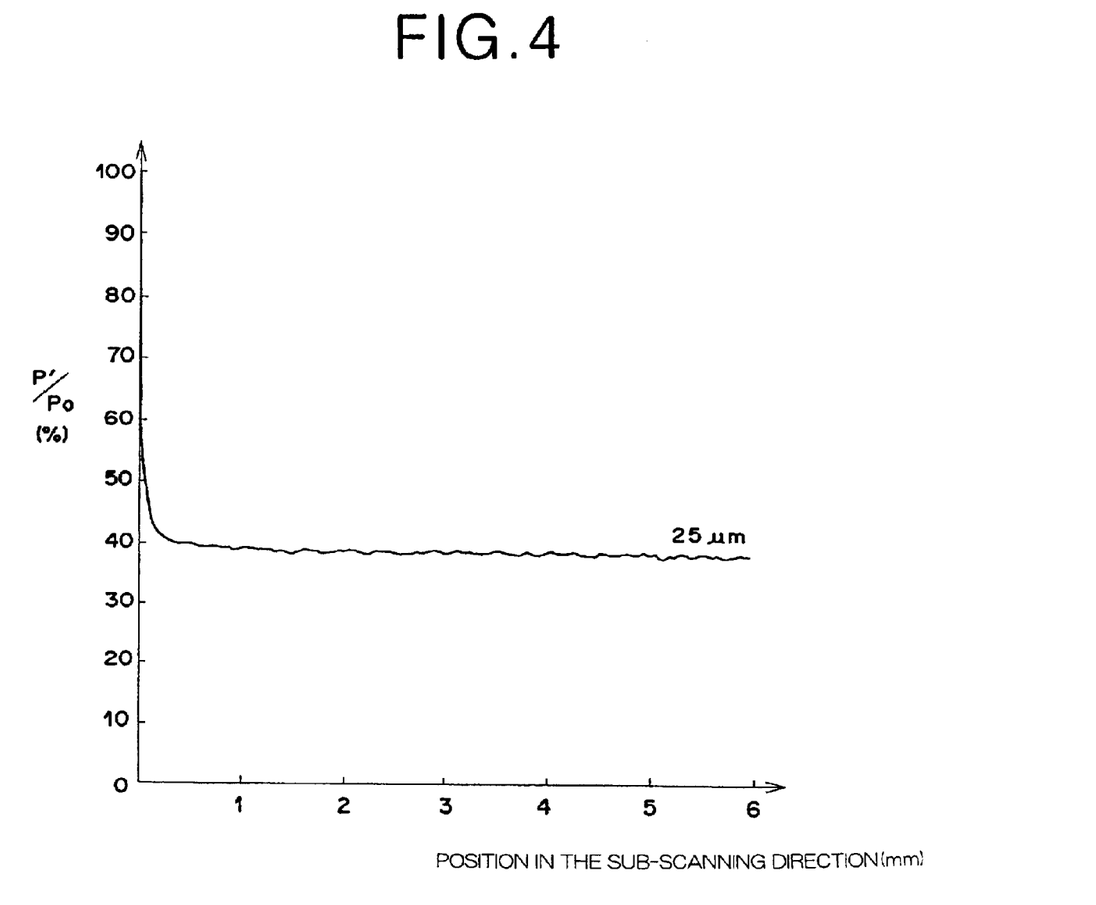
FIG. 4 is a graph illustrating the relation between the relative value $P_o/P'$ of the average value $P_o$ of the output signal of the first scanning line irradiated in the main scanning direction and the average value P' of the output signal of each scanning line irradiated in the main scanning direction accompanying the movement in the sub-scanning direction, and the distance of the movement in of the movement in the sub-scanning direction when a stimulable phosphor sheet on which a radiation image of a uniform concentration has been recorded is read out.

Here, if the average value of the output signal of the first scanning line irradiated by the line beam laser light in the direction X is designated as $P_O$, when a stimulable phosphor sheet on which a radiation image of a uniform concentration has been recorded is irradiated by a line beam laser light in the direction X, and the average value of the output signal of each scanning line in the main scanning direction obtained accompanying the subsequent movement in the sub-scanning direction, whereby the phosphor sheet 50 is scanned in the direction Y, is designated as P', the relation between the relative value $P'/P_O$ of the output values and the distance of the movement in the direction Y is that shown in FIG. 4. As shown in FIG. 4, the relative value $P'/P_O$ becomes a substantially uniformly value following the sharp decrease thereof accompanying the movement in the direction Y. Therefore, if this uniform value id designated as P, the relation between $P/P_O$ and the excitation light energy I becomes that shown in FIG. 5 (however, the horizontal axis is a natural logarithm of P/Po). Note that the straight line of FIG. 5 has been formed by connecting the two points representing the respective measurements of the remainder ratio of two predetermined excitation light energies. Further, measurement values of FIGS. 4 and 5 have been obtained by the reading out of a phosphor sheet containing a navy blue colorant; wherein the readout pitch in the sub-scanning direction thereof was 25 $\mu$m.

The function shown in FIG. 5 can be theoretically obtained from the Formula (1) as follows.

$$P/P_o = (N_0 e^{-\sigma 1 \cdot I}(1-e^{-\sigma 2 \cdot I}) \cdot \alpha)/(N_0 \cdot 1 \cdot (1-e^{-\sigma 2 \cdot I}) \cdot \alpha)$$

$$P/P_o = e^{-\sigma 1 I}$$

Figure 5:
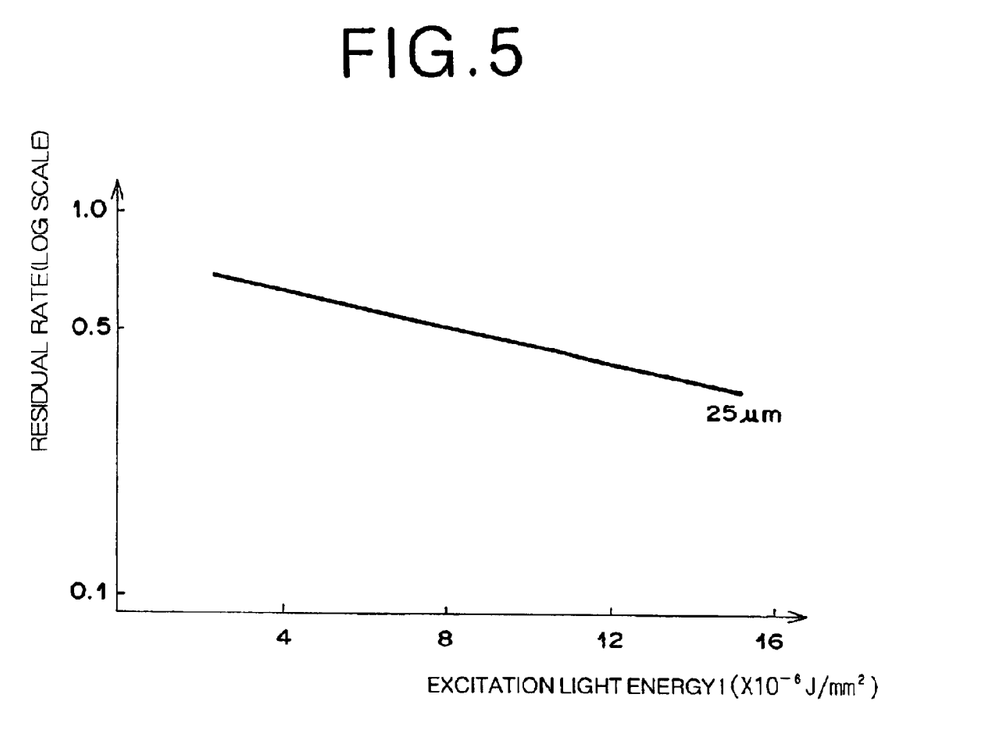
FIG. 5 is a graph illustrating the relation of the residual rate and the excitation light energy.

Whereby $1n(P/Po) = -\sigma 1 \cdot I$ Accordingly, $\sigma 1$ is represented by the slope of the straight line shown in FIG. 5; a different $\sigma 1$ is obtained for each of the phosphor sheet containing an navy blue colorant and the white phosphor sheet.

Further, by employing the value of the $\sigma 1$ obtained for the predetermined excitation light energy I, the value of $\sigma 2$ can be obtained by from the Formula (2) as follows.

If the output signals obtained when a phosphor sheet 50 is irradiated at the same pitch with two excitation light energies I, 2I, are designated as P2, P1, respectively, (measurement values):

$$P2 = N_0 e^{-\sigma 1 \cdot 2I}(1-e^{-\sigma 2 \cdot 2I}) \cdot \alpha$$

$$P1 = N_0 e^{-\sigma 1 \cdot I}(1-e^{-\sigma 2 \cdot I}) \cdot \alpha$$

And if, $e^{-\sigma 2 \cdot I} = X$ $$P_2/P_1 = e^{-\sigma 1 \cdot I}(1-X^2)/(1-X) = e^{-\sigma 1 \cdot I}(1+X)$$

$$X = (P_2/P_1)e^{\sigma 1 \cdot I} - 1$$

$$e^{-\sigma 2 \cdot I} = (P_2/P_1)e^{\sigma 1 \cdot I} - 1$$

$$-\sigma 2 \cdot I = 1n((P_2/P_1)e^{\sigma 1 \cdot I} - 1)$$

Whereby, $\sigma 2 = (-1/I) \, 1n((P_2/P_1) \, e^{\sigma 1 \cdot I} - 1)$

If the values $\sigma 1$ and $\sigma 2$ obtained as described above are inputted to the Formula (2) the excitation light energy I can be obtained.

(Formula (2) is derived from the dP/dI=0 of Formula (1).)

$$I = 1/\sigma 2 \cdot 1n(1+\sigma 2/\sigma 1) \quad (2)$$

Note that different $\sigma 1$ and $\sigma 2$ are obtained for each of the phosphor sheet containing a navy blue colorant and the white phosphor sheet; an excitation light energy $I_b$ and $I_w$, respectively, can be obtained corresponding to the diffusion rates of the respective phosphor sheets.

Further, it can be shown theoretically from the Formula (2), as follows, that $I_w < I_b$. First, because the diffusion rate of the phosphor sheet containing a navy blue colorant and a white phosphor sheet is suppressed, the relation between the residual rate $e^{-\sigma 1b}$ thereof and the residual rate $e^{-\sigma 1w}$ of the white phosphor sheet is:

$$e^{-\sigma 1b} \gg e^{-\sigma 1w}$$

Whereby, $\sigma 1b \ll \sigma 1w$

Still further, because there is absorption of the excitation light and the stimulated emission by the navy blue colorant of the phosphor sheet containing the navy blue colorant, the relation between the readout rate $1-e^{-\sigma 2b}$ and the readout rate $1-e^{-\sigma 2b}$ of the white phosphor sheet is:

$$1-e^{\oplus\sigma 2b} \leq 1-e^{-\sigma 2w}$$

Whereby, $\sigma 2b \leq \sigma 2w$

Therefore, $1+\sigma 2b/\sigma 1b \gg 1+\sigma 2w/\sigma 1w$, $1/\sigma 2b \geq 1/\sigma 2w$, and $I_b - I_w = 1/\sigma 2b \cdot \ln(1+\sigma 2b/\sigma 1b) - 1/\sigma 2w \cdot \ln(1+\sigma 12w/\sigma 1w) > 0$ Whereby, $I_w < I_b$ is shown.

Accordingly, the excitation light energy controlling means 60 is a means for controlling the excitation light energy so that the excitation light energy projected onto the phosphor sheet containing a navy blue colorant is of a larger magnitude than that projected onto the white phosphor sheet.

Here, the scanning mechanism can be a conveyor belt or the like, or a mechanism for fixing the stimulable phosphor sheet 50 at one end thereof and moving same; so long as the stimulable phosphor sheet 50 is movable in the X, Y directions, the scanning mechanism can be of any configuration.

Further, the excitation light source is not necessarily limited to being of the configuration of that according to the current embodiment, but maybe of a configuration, for example, wherein: the excitation light source is a line light source or a light source having an optical system which causes a line beam laser light to scan the stimulable phosphor sheet 50 along a main scanning line, and the scanning mechanism conveys the stimulable phosphor sheet 50 in the sub-scanning direction only to two-dimensionally scan the stimulable phosphor sheet 50. Further, the excitation light source can be of a configuration in which a laser light is caused to two-dimensionally irradiate, by scanning thereof, the stimulable phosphor sheet 50, wherein the stimulable phosphor sheet 50 is not moved in the X, Y directions.

Still further, the filter 21 cuts off light having a wavelength of 640 nm, which is the wavelength of the laser light, and transmits light having a wavelength shorter than 640 nm, of which the stimulated emission is formed.

In addition, the lenses 14 and 23 form a confocal optical system. In this manner, by forming a confocal optical system from the lenses 14 and 23, a high-resolution, high-S/N ratio output signal can be read out from the stimulable phosphor sheet 50.

Further, it is desirable that the diameter of the lens 25 of the aperture 24, which is disposed so as to be positioned at the focal point of the lens 23, be set taking into account the fact that the light emitting points of the stimulable phosphor sheet which emit stimulated emission are distributed in the direction of depth of the stimulable phosphor layer, and that the light emitting points fluctuate in the direction of depth of the stimulable phosphor layer.

Further, although according to the embodiment described above, the stimulated emission has been converted to an electric image signal by use of a photomultiplier, the photoelectric converting means is not limited thereto; the photoelectric converting means may be a CCD sensor, or a line sensor comprising a plurality of photoelectric converting elements arranged in a row.

Next, the operation of the radiation image readout apparatus according to the current embodiment will be explained. First, the stimulable phosphor sheet 50, on which a radiation image has been recorded, is conveyed by the scanning mechanism (not shown) in the direction of arrow Y to the position where the laser beam is projected onto said stimulable phosphor sheet 50.

Then, the input means 80 inputs the phosphor sheet type to the recognizing means 70, and the recognizing means 70 discerns, based on the input signal from the input means 80, the type of the phosphor sheet 50 to be read out. The phosphor sheet type discerned by the recognizing means 70 is inputted to the excitation light energy controlling means 60. The excitation light energy controlling means 60 obtains (according to the current embodiment, obtains the excitation light intensity and readout speed based on the excitation light energy $L_b$ when a phosphor sheet containing a navy blue colorant is to be read out, and obtains the excitation light intensity and readout speed based on the excitation light energy $L_w$ when a white phosphor sheet is to be read out) the excitation light intensity and readout speed corresponding to the phosphor sheet type by referring to the LUT, and outputs a control signal so that a laser light of the corresponding intensity is projected from the excitation light source 1. The excitation light source 1 into which the control signal has been inputted emits at the intensity corresponding to said control signal the laser light 4. After the laser light 4 emitted from the excitation light source 1 has been converted to a parallel light by the collimator lens 2, the laser light 4 is reflected by a mirror 3. The laser light 4 reflected by the mirror 3 enters the mirror 11, is reflected by the mirror 11 so as to pass through the hole 12 formed on the interior portion of the perforated mirror 13, and focused by the lens 14 and projected onto the stimulable phosphor sheet 50. The stimulated emission 15 emitted from the stimulable phosphor sheet 50 upon the irradiation thereof by the laser light 4 is converted to a parallel light by the lens 14, reflected by a mirror portion of the perforated mirror 13, that is, the portions other than the hole 12, and enters the excitation light cutoff filter 21. After the stimulated emission that has passed through the excitation light cutoff filter 21 and the light of a predetermined wavelength range has been removed therefrom, the stimulated emission 15 enters the mirror 22, is reflected by the mirror 22, and focused by the lens 23. The stimulated emission 15 focused by the lens 23 is focused onto the light receiving face of the photomultiplier 26 by the aperture 24, photoelectrically converted by the photomultiplier 26, and outputted as an analog signal.

Next, the scanning mechanism scans, based on the readout speed outputted from the excitation light energy controlling means 60, the phosphor sheet 50 in the X direction, and an analog signal is sequentially outputted from the photomultiplier 26 by the same operation described above. Then, the entirety of the phosphor sheet 50 is two-dimensionally scanned by sequentially repeating the scanning operation in the X and Y directions.

According to the radiation image readout method and apparatus of the present invention, when the readout of a plurality of stimulable phosphor sheets having different diffusion rates with respect to the excitation light is to be performed by a single apparatus, because the readout is performed by emitting an excitation light of an energy level which is greater as the excitation light diffusion rate of the stimulable phosphor sheet is smaller, the readout of stimulable phosphor sheets containing a predetermined colorant and white stimulable phosphor sheets not containing the predetermined colorant can be performed at a high resolution. At this time, if the readout is performed at the respective excitation light energy levels $I_b$, $I_w$ as shown in FIG. 2, the readout can be performed at an even higher sensitivity.

Further, although according to the embodiment described above, the excitation light energy projected onto a stimulable phosphor sheet containing a predetermined colorant and a white stimulable phosphor sheet has been controlled, for cases in which a diffusion-suppressed phosphor sheet other than that containing the navy blue colorant is to be performed, the excitation light energy corresponding to the diffusion rate of the phosphor sheet to be read out can be obtained in the same manner as in the above-described embodiment, and the excitation light projected onto said phosphor sheet at the excitation light energy level corresponding thereto. For example, the excitation light energy projected onto a diffusion-suppressed phosphor sheet can be 1.5 or more times the excitation light energy projected onto the white stimulable phosphor sheet; further, the excitation light energy projected onto a diffusion-controlled phosphor sheet can be 3 or more times the excitation light energy projected onto the white stimulable phosphor sheet.

Still further, although according to the embodiment described above the excitation light energy has been controlled according to the type of the phosphor sheet to be read out, of which different types have a different excitation light diffusion rate, the power of the excitation light can be controlled in accordance to the pitch of the direction Y.

Here, due to the effect whereby the radiation energy on adjacent scanning lines is dissipated by the scattered excitation light, the relation between the excitation light energy and the output signal for the readout pitch for the direction Y, is that shown in FIG. 3 (the relation when the sub-scanning direction pitch is 25 μm, 50 μm, and 100 μm, respectively); wherein on the one hand, up to a predetermined magnitude of excitation light energy, the magnitude of the output signal increases as the magnitude of the excitation light energy increases, and on the other hand, the magnitude of the output signal decreases due to the effect of the dissipation of the radiation energy stored on adjacent scanning lines if the excitation light energy exceeds the predetermined value, for any of the above-described pitches. Therefore, the magnitude of excitation light energy at which the decrease of the magnitude of the output signal begins becomes smaller in proportion to the smallness of the pitch. Accordingly, it is desirable that the excitation light energy level be controlled so that an adequate signal level is obtained at each pitch; for example, $I_{25}$, $I_{50}$, $I_{100}$, wherein the excitation energy level is controlled to the level whereat the largest output signal for each respective pitch is obtained.

For cases in which the excitation light energy is controlled by the readout pitch in the direction Y in addition to the use of a plurality of types of phosphor sheets having different excitation light diffusion rates, the magnitude of the excitation light energy can be determined by obtaining the σ1 and the σ2, respectively, corresponding to the phosphor sheet type and the readout pitch in the direction Y.

By controlling the excitation light energy as described above, it is possible to perform the readout at a higher resolution and a higher sensitivity.

Note that the radiation image readout apparatus according to the present invention is not limited to being of the configuration of that of the above-described embodiment; for example, the light source, the focusing optical system between the light source and the stimulable phosphor sheet, the optical system between the stimulable phosphor sheet and the photomultiplier, the photomultiplier may be of any of various known configurations. Further, the radiation image readout apparatus may be further provided with an image processing system for subjecting the image signal output from the radiation image readout apparatus to various image processes, or an eraser means which causes an erasing light to scan the stimulable phosphor sheet to fully dissipate the residual radiation energy after the readout of an image has been completed.

What is claimed is:

1. A radiation image readout method comprising the steps of:

scanning an excitation light in a main scanning direction and a sub scanning direction over the surface of a stimulable phosphor sheet, on which radiation energy has been cumulatively stored, so as to two-dimensionally irradiate the stimulable phosphor sheet with the excitation light, performing readout of the stimulable phosphor sheet by receiving and photoelectrically converting the stimulated emission emitted from the portions of the stimulable phosphor sheet irradiated by the excitation light to obtain an output signal, wherein, when the readout of a plurality of stimulable phosphor sheets having different diffusion rates with respect to the excitation light is to be performed by a single apparatus, the readout is performed by emitting an excitation light of an energy level which is greater as the excitation light diffusion rate of the stimulable phosphor sheet to be read out is smaller.

2. A radiation image readout apparatus comprising:

an illuminating means for two-dimensionally scanning, by scanning in a main scanning direction and a sub-scanning direction, a line beam excitation light over the surface of a stimulable phosphor sheet on which a radiation image has been recorded, and a photoelectrical converting means for receiving and photoelectrically converting the stimulated emission emitted from the portions of the stimulable phosphor sheet which have been irradiated by the excitation light, further comprising a recognizing means for discerning the data relating to the excitation light diffusion rates of a plurality of types of stimulable phosphor sheets, and an excitation light energy controlling means for controlling, based on the data related to the excitation light diffusion rate of the stimulable phosphor sheet recognized by the recognizing means, the energy level of the excitation light so that the excitation light is emitted at an energy level which is greater as the excitation light diffusion rate of the stimulable phosphor sheet is smaller.

3. A radiation image readout apparatus as defined in claim 2, wherein for cases in which the plurality of stimulable phosphor sheets consists of stimulable phosphor sheets containing a predetermined colorant and white stimulable phosphor sheets not containing the predetermined colorant, said excitation light energy control means controls the excitation light energy so that the excitation light projected onto the stimulable phosphor sheet containing the predetermined colorant is of a greater energy level than that of the excitation light projected onto the white stimulable phosphor sheet.

4. A radiation image readout apparatus as defined in claim 3 wherein said predetermined colorant is a navy blue colorant.

5. A radiation image readout apparatus as defined in either of the claims 3 or 4, wherein the excitation light energy projected onto a stimulable phosphor sheet containing a predetermined colorant is 1.5 or more times the excitation light energy projected onto the white stimulable phosphor sheet.

6. A radiation image readout apparatus as defined in either of the claims 3 or 4, wherein the excitation light energy projected onto a stimulable phosphor sheet containing a predetermined colorant is 3.0 or more times the excitation light energy projected onto the white stimulable phosphor sheet.

7. A radiation image readout apparatus as defined in any of the claims 2, 3, or 4, wherein the excitation energy control means can be a means for further controlling the excitation light energy according to the pitch of the sub-scanning direction of the portions of the stimulable phosphor sheet irradiated with the line beam excitation light in the main scanning direction.

8. A radiation image readout apparatus as defined in claim 5, wherein said excitation energy control means is a means for further controlling the excitation light energy according to the pitch of the sub-scanning direction of the portions of the stimulable phosphor sheet irradiated with the line beam excitation light in the main scanning direction.

9. A radiation image readout apparatus as defined in claim 6, wherein the excitation energy control means can be a means for further controlling the excitation light energy according to the pitch of the sub-scanning direction of the portions of the stimulable phosphor sheet irradiated with the line beam excitation light in the main scanning direction.

10. A radiation image readout apparatus as defined in any of the claims 2, 3, or 4 wherein the pitch in the sub-scanning direction of the portions to be scanned with a line beam excitation in the main scanning direction is less than or equal to 50 $\mu$m.

11. A radiation image readout apparatus as defined in any of the claims 2, 3, or 4 wherein the pitch in the sub-scanning direction of the portions to be scanned with a line beam excitation in the main scanning direction is less than or equal to 25 $\mu$m.

12. A radiation image readout apparatus as defined in any of the claims 2, 3, or 4 wherein said excitation energy control means is a means for controlling the excitation light energy by controlling the intensity of the excitation light.

13. A radiation image readout apparatus as defined in any of the claims 2, 3, or 4 wherein said excitation energy control means is a means for controlling the excitation light energy by controlling the scanning speed of the excitation light in at least one of the main scanning direction and the sub-scanning direction.

* * * * *